3,469,809
VIBRATION-ABSORBING BASE
David E. Reznick, 183 S. June St., Los Angeles, Calif.
90004, and Ernoe A. Fekete, 9835 La Docena
Lane, Pico Rivera, Calif. 90660
Filed Aug. 14, 1967, Ser. No. 660,336
Int. Cl. F16f 15/00; F16d 63/00
U.S. Cl. 248—20                                    4 Claims

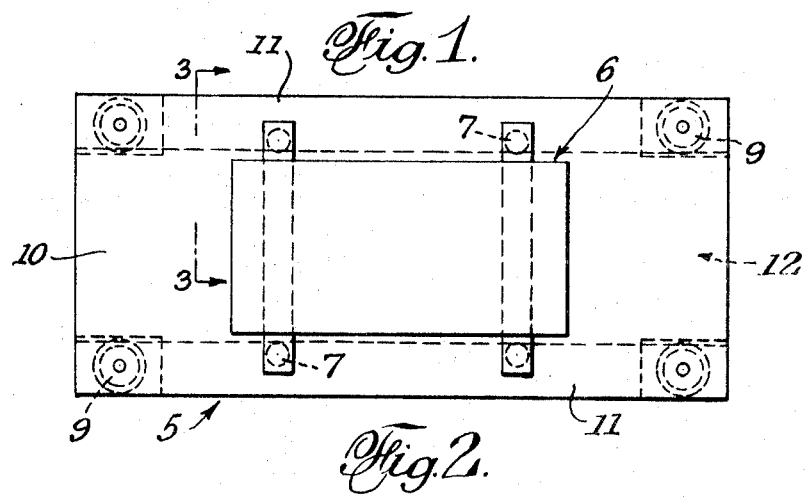
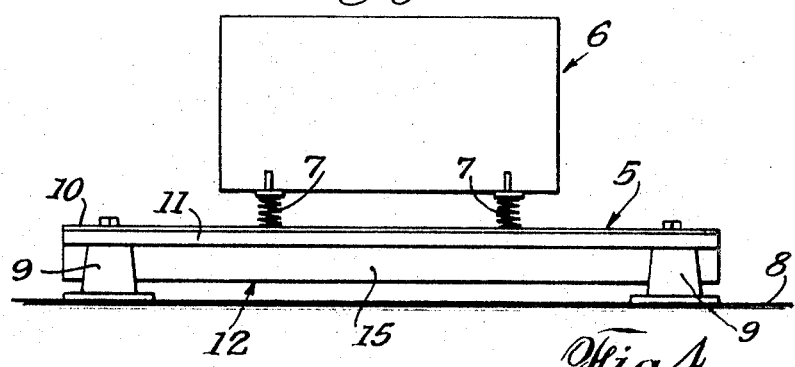
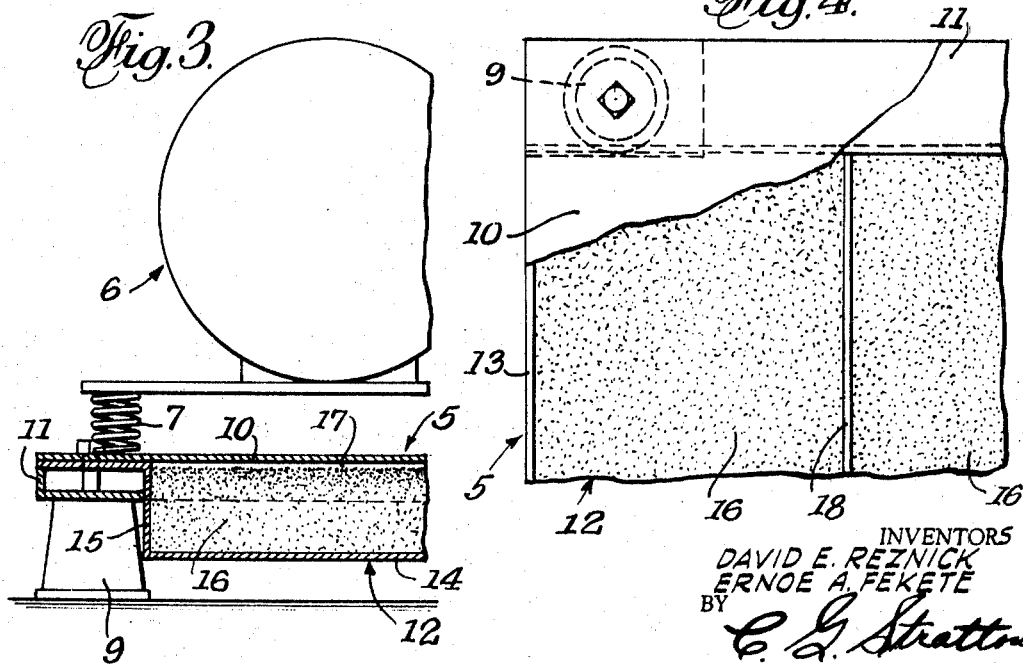
INVENTORS
DAVID E. REZNICK
ERNOE A. FEKETE
BY
C. G. Stratton
ATTORNEY United States Patent Office 3,469,809
Patented Sept. 30, 1969

ABSTRACT OF THE DISCLOSURE

A base that mounts devices or machines that vibrate either when operating, or when starting up, is shock-mounted, as on the roof of a building, and is provided with a shiftable ballast which absorbs such vibration, thereby minimizing transmission of the vibration to the building.

BACKGROUND OF THE INVENTION

While having many other uses and types of installation, the present vibration-absorbing base is particularly adapted for rooftop installation of heat exchangers and other apparatus that employ reciprocating compressors, motors, generators, and other units that are either continuously or intermittently operative and particularly those units that, due to torque effects, have high vibration when starting up and when stopping. Due to the skeletal structural form of buildings, the same are subject to vibrating in response to transmitted vibrations of such roof-mounted machines. It is an object of the invention to provide a support base for such machines which, by absorbing the vibrations above mentioned, eliminates or, at least materially reduces, the undesired bothersome and, in some cases, destructive effects that originate with the vibrations of roof-mounted machines or apparatus.

Heretofore, only various types of shock mounts, either of pad, cushion or unit design, have been employed for vibration control of vibrating machines and, while effective to a degree, they promoted rather than lessened the vibratory movement of the machines, since the machines moved relatively to the building more so than if fastened rigidly to the building. It is another object of the invention to provide ballast means that when used in combination with shock mounts absorbs the inertia forces of the machine, thereby smoothening the reactive movement of the machine base before the vibration thereof reaches the shock mounts.

SUMMARY OF THE INVENTION

The present vibration-absorbing base 5 is shown as mounting a machine or comparable vibrating unit 6 by means of resilient mounts 7 and is itself mounted on a surface 8 by means of shock mounts 9. The machine 6 may be a reciprocating compressor, as used in air conditioning equipment, or for other purposes, or any vibrating machine, as motors, generators, turbines, etc. which either vibrate in operation or when starting up and stopping. The mounts 7 are generally conventional and per se, form no part of this invention. The shock mounts 9, also, may take various forms, those of double-deflection, rubber-in-shear being exemplary. The surface 8 represents the roof of a building or a surface of an upper extension of the roof or any other upper part of a building. It is common practice to secure the shock mounts 9 to the surface 8.

BRIEF DESCRIPTION OF THE DRAWINGS

In the drawings, like reference characters designate similar parts in the several views.

FIG. 1 is a plan view of a vibration-absorbing base supporting a vibrating unit 6.

FIG. 2 is a side elevational view thereof.

FIG. 3 is an enlarged cross-sectional view as taken on the line 3—3 of FIG. 1.

FIG. 4 is a similarly enlarged fragmentary plan view of the vibration absorbing base.

DESCRIPTION OF THE PREFERRED EMBODIMENT

The base 5 is shown as of elongated rectangular form having a top wall 10, longitudinal marginal portions 11 along both edges, and a centrally disposed horizontal chamber 12 that is shown as extending between the end walls 13. The ends of the marginal portions 11 have the mounts 9 secured thereto, the base 5 thereby being supported by its four corners. The wall 10 closes the chamber 12 at the top, a wall 14 closes the bottom, end walls 13 close the ends, and side walls 15 close the sides inward of the marginal portions 11.

According to the invention, the chamber 12 is provided with ballast 16 which is here shown as a sand-like mass substantially filling the chamber 12. The term "sand" or "sand-like" is here used to define a fine, noncompacting material, comprised of particles of a size in the nature of two mms. and which are of granular form so a mass thereof has substantial porosity. While the chamber may be substantially filled with the sand, it is not compacted and may even be filled to a level leaving a small space 17 below the wall 10.

Thus, the ballast 16 is neither solid, as would be a solid mass of metal, wood, or the like; nor fluid, as would be a mass of liquid that has no aeration or very little air or gas inclusion; but yet has mobility among the particles that produces a vibration-damping effect on any vibration that is transmitted to the base by the unit 6. In other words, the grains of sand shift in all directions, as induced by vibrations, thereby providing a base that applies forces to the mounts 9 that have been smoothened out by the limited fluidity of the ballast.

It will be clear that a solid mass of liquid, because it is incompressible or substantially so, will act in the same way as a metal weight, i.e., have high inertia. A liquid mass, if it does not fill the chamber 12, will slosh around, creating a water hammer on the walls of the chamber and being undesirable as ballast on that account. The present sand-like mass, whether or not it totally fills the same includes a large proportional amount of air, such ballast will neither impose inertia on the base 5 nor will it have the destructive hammering effects above mentioned.

The present sand-ballasted base having a smoothened transmission of vibration of the unit 6 to the mounts 9, the latter, due to the absorption of vibration in the base, has a minimum vibratory effect on the structural components of the building upon which such a base is mounted.

The chamber 12 may be divided into smaller compartments by partitions 18 which, in this case, extend transversely. The sand in each said compartment being confined thereto.

The weight of the mass or body of the sand 16 will be substantially less than any of the metals that would ordinarily be used as ballast, but would be greater than the same mass or body of water. It may be said that the specific gravity of the present air-included sand mass would be in a specific gravity range between two and three.

The shock mounts 9 are secured, as shown in the drawing, at the four corners of the base 5, the same, at least with respect to the spacing of the shock mounts along the greater length thereof, supporting the unit 6 by means of the mentioned resilient mounts 7, the latter, as shown in FIG. 1, being longitudinally spaced along the base and within the space between the shock mounts 9 at each end of the base.

Having thus described this invention, what is claimed and desired to be secured by Letters Patent is:

1. In combination with a unit subject to movement under vibration and the support surface mounting said unit,
    (a) a horizontally disposed rectangular vibration-absorbing base interposed between said unit and said support surface and having a horizontally disposed chamber therein, said base having opposite side walls and opposite end walls,
    (b) vibration-damping material comprising a porous and granular mass of particles of sand-like consistency substantially but not fully filling said chamber,
    (c) the longitudinal spacing of said transverse pairs spaced transverse pairs and interposed between the top of the base and the vibrating unit, thereby mounting the latter to transmit its vibration to the base through said springs, and
    (d) a set of four shock mounts connected to the four corners of the base and interposed between said base and the support surface, whereby the vibration of the base, as damped by the mass of material therein, and further damped by the shock mounts, is transmitted to said support surface.

2. The combination according to claim 1 in which the chamber is divided into compartments by partitions extending transversely thereacross.

3. The combination according to claim 1 in which:
    (a) the base is of elongated rectangular form and the chamber extends longitudinally,
    (b) a longitudinal marginal portion on the base between the chamber and each longitudinal edge, and
    (c) the shock mounts being connected to the ends of said portions.

4. The combination according to claim 1 in which the base is elongated in the same direction as the longitudinal spacing of the mentioned transverse pairs of support springs and in which:
    (a) said elongated base thereby having two oposite longitudinal sides and two opposite transverse ends, and
    (b) the four shock mounts, being disposed at the four corners of the base, thereby being arranged in longitudinally spaced pairs,
    (c) the longitudinal spacing of said transverse pairs of shock mounts being greater than the longitudinal spacing of said transverse pairs of support springs.

References Cited

UNITED STATES PATENTS

| | | | |
|---|---|---|---|
| 1,853,104 | 4/1932 | Weiss | 248—22 |
| 2,072,244 | 3/1937 | Coursen | 248—22 |
| 2,195,041 | 3/1940 | Von Schlippe. | |
| 2,302,670 | 11/1942 | Buchanan. | |
| 2,417,347 | 3/1947 | Brown. | |
| 2,775,444 | 12/1956 | Hadley. | |

DUANE A. REGER, Primary Examiner

U.S. Cl. X.R.

188—1